United States Patent [19]

Carnine

[11] 4,019,812
[45] Apr. 26, 1977

[54] REARVIEW MIRROR ASSEMBLY WITH ROTATABLE MIRRORS

[76] Inventor: Elmo Carnine, 1260 NE. 115th St., Miami, Fla. 33161

[22] Filed: June 5, 1975

[21] Appl. No.: 584,220

[52] U.S. Cl. .............................................. 350/304
[51] Int. Cl.² .................................... G02B 5/08
[58] Field of Search .......... 350/304, 303, 302, 307, 350/299, 301; 248/479, 480, 226 B

[56] References Cited

UNITED STATES PATENTS

| | | | |
|---|---|---|---|
| 1,416,966 | 5/1922 | Morris | 350/304 |
| 1,969,415 | 8/1934 | Ostroff | 350/304 |
| 2,214,639 | 9/1940 | Lenta | 350/304 |
| 2,802,394 | 8/1957 | Krone | 350/304 |
| 3,021,756 | 2/1962 | Milton et al. | 350/304 |
| 3,151,207 | 9/1964 | Moller | 350/303 |
| 3,790,117 | 2/1974 | Winkler | 350/304 |

Primary Examiner—John K. Corbin
Assistant Examiner—Jon W. Henry
Attorney, Agent, or Firm—Allen D. Brufsky

[57] ABSTRACT

A rear view mirror assembly especially adapted to be connected to the vehicles standard mirror thereby increasing vision and substantially reducing the "blind spot".

8 Claims, 4 Drawing Figures

U.S. Patent   April 26, 1977   4,019,812
FIG.1
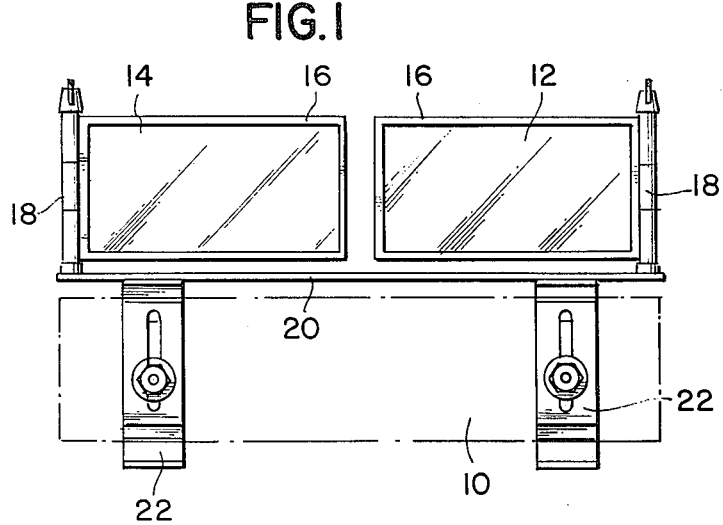
FIG.2
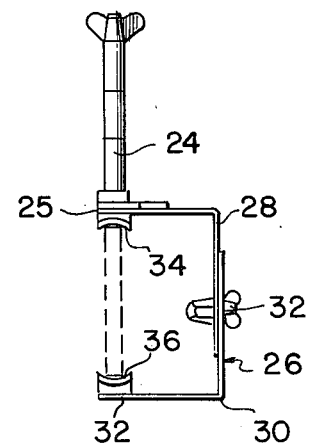
FIG.3
FIG.4
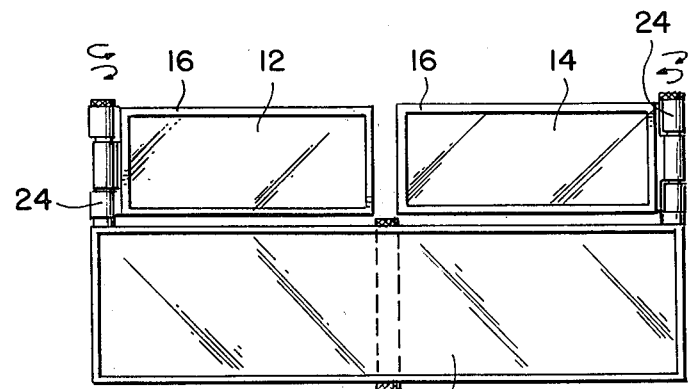
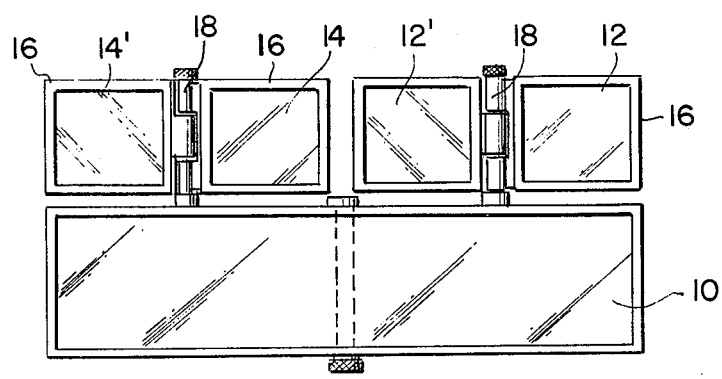

REARVIEW MIRROR ASSEMBLY WITH ROTATABLE MIRRORS

BACKGROUND OF THE INVENTION

This invention relates to a rear view mirror blind spot-reducing device, more particularly to a mirror assembly that is adapted to be connected to the vehicles standard rear view mirror, either at the top or bottom thereof.

The prior art teaches a variety of rear view mirror assembly devices, for example, U.S. Pat. Nos. 2,605,676; 3,151,207; 3,411,843 and others. These devices are, however, deficient in many respects, for example, they provide only lateral compensation for the existing mirror.

SUMMARY OF THE INVENTION

It is accordingly an object of the instant invention to avoid one or more drawbacks of the prior art.

It is another object to provide for a simply constructed and easily adaptable auxilliary mirror assembly.

These and other objects of the prior art will become more apparent from the following detailed description and claims, and in the accompanying drawings, in which:

FIG. 1 is a front elevational view of one embodiment of the device attached to the top portion of an existing vehicular rear view mirror;

FIG. 2 is a side elevational view of a swivel post adapted to provide rotational movement; and FIGS. 3-4 are similar to FIG. 1 but showing a further embodiment thereof.

Broadly speaking, the instant invention includes the provision of a rear view mirror assembly adapted to be used in conjunction with an existing rear view vehicular mirror comprising an elongated base portion, at least a pair of first means adapted to longitudinally rotate on its own axis, the first means communicating with the base portion, at least two mirror sections, each of the sections rotatably engaged to a corresponding member of the pair of first means, at least one second means connected to a portion of the base and adapted to engage the assembly to the existing mirror.

DETAILED DESCRIPTION

Referring more particularly to the drawings in which like characters are designated by like numerals, there is shown an existing vehicular rear view mirror 10. Attached thereto at either the top or bottom thereof is the instant mirror assembly comprising a plurality of mirrors 12, 14 preferably two, though three of four or more may also be employed. The greater the number of mirrors employed, the correspondingly smaller in size each becomes. Each mirror 12, 14 will preferably have a frame means 16 to facilitate attachment of the mirror 12, 14 to means 18 suitable to provide journalling and rotational movement of the mirrors 12, 14 about the axis thereof, such as 180° or 360°. Means for providing the foregoing include, for example, a ball and socket, a pin and pin holding sleeve such as a hinge type assembly and the like. A base 20 is preferably provided to facilitate affixation of the device to the existing mirror 10 and stabilization thereof. The base 20 is generally an elongated horizontal member that communicates with the means 18, such as being spaced therebetween where two mirrors 12,14 are employed. The base 20 is suitably affixed to the means 18 such as by welding, screwed thereinto, etc. It is preferred that the mirrors 12, 14 are not in contact with the base 20 so as to provide for ease of movement thereof; though they may just as well contact the same. Means 22 for suitably mounting the mirror assembly on the mirror 10 are provided. These means 22 can be in the form of spring clamps, V-shaped clamps adapted to be brought together and tightened at the open end after positioning the same over the mirror 10, and the like. The means 22 are affixed to the base 20 on the side thereof opposite where the mirrors are disposed.

In a further embodiment of the invention, as is shown in FIG. 4, the base 20 is not necessarily needed and the means 18 may be secured directly to the existing mirror 10. This may be accomplished, for example, by employing means as is shown in FIG. 2. The means is comprised of a rotatable member 24 adapted to provide rotational movement by journalling about the longitudinal axis thereof. A base portion of the member 24 is adapted to receive one end 25 of a U-member 26 that is essentially two L members 28, 30 joined together at the base portion forming the U by a coupling means 32, such as a thumb screw or the like. The U member formed thereby is adapted to function as an adjustable bracket operative to provide telescoping and/or slidable overlap of two communicating legs of the L members 28, 30. The second end 32 of the U member is free and is therefore adapted to move between positions of substantial contact and separation from said first end 25 by the relative movement of the two substantial right angle legs of the L members 28, 30. It is preferable that each exposed end 25, 32 be creped or covered with suitable cushioning means 34, 36 to provide a buffer between the ends 25, 32 and the top and bottom sections of the mirror 10.

A still further embodiment contemplates two mirrors 12, 12' and 14, 14' journalled for rotational movement about two means 18 or 24. In this instance each means 18 or 24 will accomodate two mirrors, one at either side thereof.

In place of or in addition to either U means 26 or 18, there may be employed a resiliant U or spring clamp means adapted to secure the base 20 and the assembly having the means 18 to the mirror 10 by merely communicating between the top of means 18 and the undersection of the mirror, thereby eliminating if desired, the means 22. The same may be employed with the four mirror assembly of FIG. 5 employing means 18 or the means 26 with or without the resiliant U clamp.

While the above invention has been described with reference to the specific embodiments shown in the drawings, it is to be understood that various modifications and changes will be apparent to the skilled artisan; all of which are intended to be included herein.

What I claim is:

1. A rear view mirror assembly comprising an existing rear view vehicular mirror, an elongated base portion, connecting means for connecting said base portion to said existing mirror, at least a pair of rotational means, each adapted to longitudinally rotate on its own axis, each of said rotational means extending outwardly from the same side of said base portion in a direction upwardly from said existing mirror, each of said rotational means being transverse to said base portion, at least two mirror sections, each of said mirror sections rotatably engaged to one of said rotational means, said mirror sections being adjacent and extending between said pair of rotational means, said mirror sections being vertically disposed above said existing mirror.

2. An assembly as defined in claim 1 wherein said connecting means is a clamp.

3. An assembly as defined in claim 1 wherein there are a pair of said connecting means.

4. An assembly as defined in claim 1 wherein there are four mirror sections, and two pairs of rotational means, each pair of rotational means communicating with two mirror sections.

5. An assembly as defined in claim 1 containing frame means adapted to receive and hold said mirror section, said frame means being connected to said rotational means.

6. An assembly as defined in claim 1 wherein said connecting means is an adjustable U clamp.

7. An assembly as defined in claim 6 wherein said U clamp is comprised of two right angle leg members adapted to move between an open and a substantially closed position thereby decreasing the distance between the opening of the U shape.

8. An assembly as defined in claim 1 wherein each of said rotational means extends outwardly from the same side of said base portion.

* * * * *